(12) United States Patent
Wester

(10) Patent No.: US 6,507,439 B1
(45) Date of Patent: Jan. 14, 2003

(54) MICROLENS FORMATION THROUGH FOCAL PLANE CONTROL OF AN AERIAL IMAGE

(75) Inventor: Neil Wester, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/561,314

(22) Filed: Apr. 28, 2000

Related U.S. Application Data

(63) Continuation of application No. 09/052,103, filed on Mar. 31, 1998, now Pat. No. 6,083,429.

(51) Int. Cl.[7] .................. G02B 27/10; H01L 27/148; H01L 21/00
(52) U.S. Cl. .................. 359/619; 257/432; 257/332; 438/70; 438/65; 438/60; 264/1.38
(58) Field of Search .................. 359/619, 618; 257/432, 232, 233, 433; 438/60, 65, 69, 70; 349/95; 250/208.1, 216; 264/1.38

(56) References Cited

U.S. PATENT DOCUMENTS

| | | | |
|---|---|---|---|
| 5,148,322 A | 9/1992 | Aoyama et al. | |
| 5,574,580 A | 11/1996 | Ansley | |
| 5,604,635 A | 2/1997 | Lawandy | |
| 5,677,200 A * | 10/1997 | Park et al. | 257/432 |
| 5,768,022 A | 6/1998 | Lawandy | |
| 5,770,123 A | 6/1998 | Hatakeyama et al. | |
| 5,830,605 A | 11/1998 | Umeki et al. | |
| 5,976,907 A * | 11/1999 | Shigeta et al. | 438/65 |
| 6,188,094 B1 * | 2/2001 | Kochi et al. | 257/232 |
| 6,271,900 B1 * | 8/2001 | Li | 349/95 |
| 6,297,540 B1 * | 10/2001 | Assadi et al. | 257/432 |

FOREIGN PATENT DOCUMENTS

| | | |
|---|---|---|
| JP | 1-277222 | 11/1989 |
| JP | 05173003 A | 7/1993 |

\* cited by examiner

*Primary Examiner*—Loha Ben
(74) *Attorney, Agent, or Firm*—Blakely, Sokoloff, Taylor & Zafman LLP

(57) ABSTRACT

An improved method and apparatus for forming microlenses is described. The method involves defocusing light from a mask during semiconductor processing to control the curvature of microlenses being formed.

12 Claims, 3 Drawing Sheets

MICROLENS FORMATION THROUGH FOCAL PLANE CONTROL OF AN AERIAL IMAGE

CROSS-REFERENCES TO RELATED APPLICATIONS

This is a continuation of a U.S. patent application Ser. No. 09/052,103, filed Mar. 31, 1998, now U.S. Pat. No. 6,083,429.

FIELD

The present invention relates to color display and image acquisition devices. More specifically, the present invention relates to fabricating microlenses used in display and image acquisition devices.

GENERAL BACKGROUND

Microlenses have long been used in imaging devices to focus light on sensors including charge couple device (CCD) sensors and complementary metal oxide semiconductor (CMOS) sensors. The microlenses significantly improved the light sensitivity of the imaging device. An imaging device is typically made up of an array of sensors, each sensor having a small light sensitive collection area. The microlenses improve light sensitivity of the imaging device by collecting light from a large area and focusing it on a small light sensitive collection area. The ratio of the light sensitive collection area to the total area of the sensor is defined to be a fill factor. Typical fill factors in prior art designs are less than 50%.

Microlenses are also used in display devices. In a display device, a microlens may be used to focus light from a background light source to a switch. The area covered by the switch is substantially less than the area of the background light source. By using a microlens, the light output of the display device can be substantially increased.

Traditional microlenses were formed by flowing a microlens resist material. A positive photoresist is lithographically printed to form either a square or rectangular structure. The microlens resist is then baked at a temperature above the glass transition temperature such that the microlens resist flows and the structure "sags" resulting in a curved microlens with a radius of curvature. However, flowing of the microlens resist is a difficult process to control. The final shape of the microlens depends on variations in the material which can cause significant differences in the flow patterns of the microlens resist material. Thus, an array of microlenses subject to the same processing steps may vary in dimension. The variations make it very difficult to create arrays of microlenses with the same curvature and dimensions.

Thus an improved method of reproducing microlenses with similar characteristics is needed.

DETAILED DESCRIPTION OF THE INVENTION

In the following description, a method of fabricating microlenses will be described. By repeating the steps in the method, microlenses having similar characteristics and structure can be consistently reproduced.

Figure 1A:
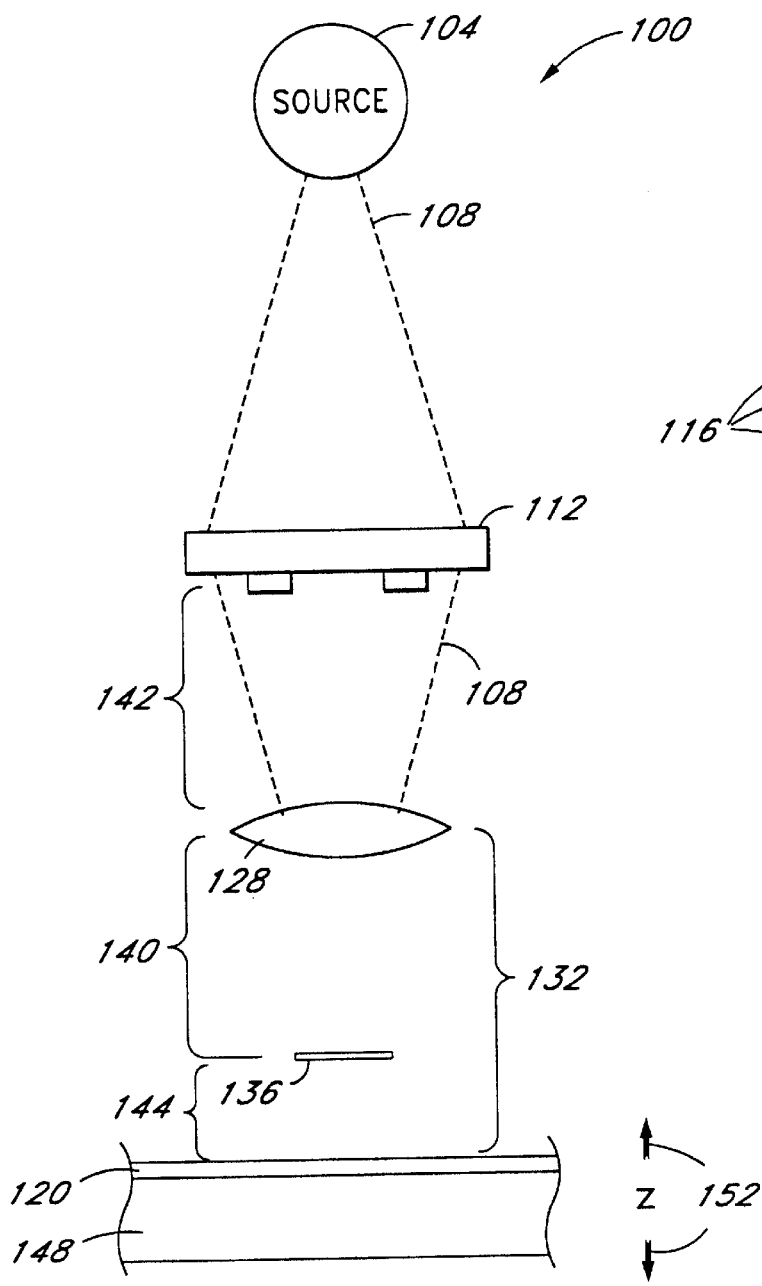
FIGS. 1A and 1B illustrate an embodiment of a device for fabricating the microlens array.
Figure 1B:
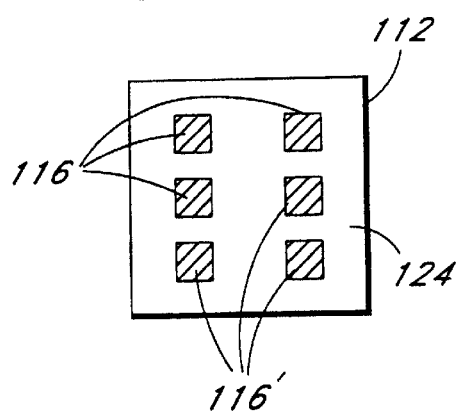

FIG. 1A illustrates an embodiment of an apparatus 100 for forming the microlenses of the present invention while FIG. 1B shows a top view of one embodiment of a reticle 112 used in the apparatus 100 of FIG. 1A. In this embodiment, a light source 104 outputs light beams 108 which are apertured through the reticle 112. The reticle 112 includes a two-dimensional pattern map of a rectangular or square patterns 116. The two-dimensional pattern map of reticle 112 may include a map of a microlens array. In the illustrated embodiment, the square patterns 116 represent pixel areas or microlens areas which will be formed in a final photolithographic process on a substrate or microlens resist 120. The squares in the pattern 116 of reticle 112 may be either opaque or transparent depending on whether a positive-resist or a negative resist is to be generated. In a negative resist, the squares in the pattern 116 are transparent while the remainder 124 of the reticle 112 of FIG. 1B is opaque. In a positive resist, the squares in the pattern 116 are opaque while the remainder 124 of the reticle 112 surface is transparent.

The light beam 108 passes through transparent areas of the reticle 112. A lens 128 generates an images of the reticle above the surface of the microlens resist 120. The distance between the lens 128 and the top surface of the microlens resist 120 at the time of irradiation is the irradiating distance 132.

In one embodiment of the invention, the image of the reticle is generated at a focusing (or imaging) point 136. Imaging distance 140 separates focusing point 136 from lens 128. The imaging distance 140 can be computed by an optics formula which, in a thin lens, can be approximated by:

$$1/f = 1/D_I + 1/D_O$$

where f=the focal length of the len 128;

$D_O$ is the distance of the reticle 112 from the lens 128 ($D_O$ is the distance 142 in FIG. 1A).

$D_I$ is the distance of the lens 128 from the imaging point 136 or distance 140 of FIG. 1A.

The preceding equation assumes a thin lens approximation and is described on pages 139–142 of Eugene Heckt's, Optics. second edition published by Edison Wesley copyrighted 1987. Lens 128 has been shown in the illustrated embodiment of FIG. 1A and described as a thin lens to allow use of the thin lens approximation to simplify computation and to illustrate the generation of the image of the reticle 112 at an imaging point 136. However, lens 128 should not be limited to a thin lens, and is typically a lens system which can be modeled using computer models. The image point of such lens systems can be determined using computer programs and more accurate computations are known for computing the exact imaging point 136 to those of skill in the art. In the illustrated embodiment, imaging point 136 is above the surface of the microlens resist 120 by an offset distance 144. The offset distance 144 is typically on the order of 4 or 5 microns although other distances may be selected. The irradiating distance 132 is the sum of imaging distance 140 and offset distance 144.

Lens 128 reduces the image of the reticle 112 for imaging onto the microlens resists 120. In one embodiment, lens 128 generates a reticle image four to five times smaller than the reticle pattern of imaging point 136.

The light rays pass through imaging point 136 where an image of the reticle 112 is generated and continue through offset distance 144. As the image of the reticle 112 passes through offset distance 144, the image of the reticle becomes defocused or "negatively focused." The negative focus and the resulting diffraction effects causes less distinct dark and bright regions in the image. The more intense UV light at the center of aperture image and the more diffuse light intensity at the border of the defocused image results in rounded feature or a curvature being lithographically imprinted onto the microlens resist 120. The curvature of the microlens can be measured using a "sag" factor. "Sag" results from the diffraction of light as it goes through imaging point 136 and diffracts through offset distance 144. Microlens resist material 120 is typically either a positive photoresist which may include phenolic novalac material or a negative photoresist such as an acrylic polymer material. In one embodiment, a positive acrylic-based photopolymer is used for microlens resist 120. The acrylic-based photopolymer is chosen because of its stability despite environmental changes, including changes in temperature and humidity. The acrylic-based photopolymer has also been found to stay transparent over time as opposed to positive resist based materials which tend to turn yellow from oxidation.

Microlens resist 120 is supported on a support structure, typically a stepper stage 148 in the illustrated embodiment. The stepper stage 148 has a Z control which allows the stepper stage 148 to move the microlens resist 120 in a Z direction 152, towards or away from lens 128. As the stepper stage 148 moves the microlens resist 120 further away from the imaging point 136, the increasing offset distance 144 results in increased defocusing and more curvature to the final microlens that is formed.

The stepper stage 148 is also movable in a lateral direction perpendicular to the Z direction 152, allowing the sequential printing of sections of the reticle 112 pattern onto the microlens resist 120. Steppers are made by a number of manufacturers including Nikon, Advanced Semiconductor Materials (ASM) and Canon.

Figure 2:
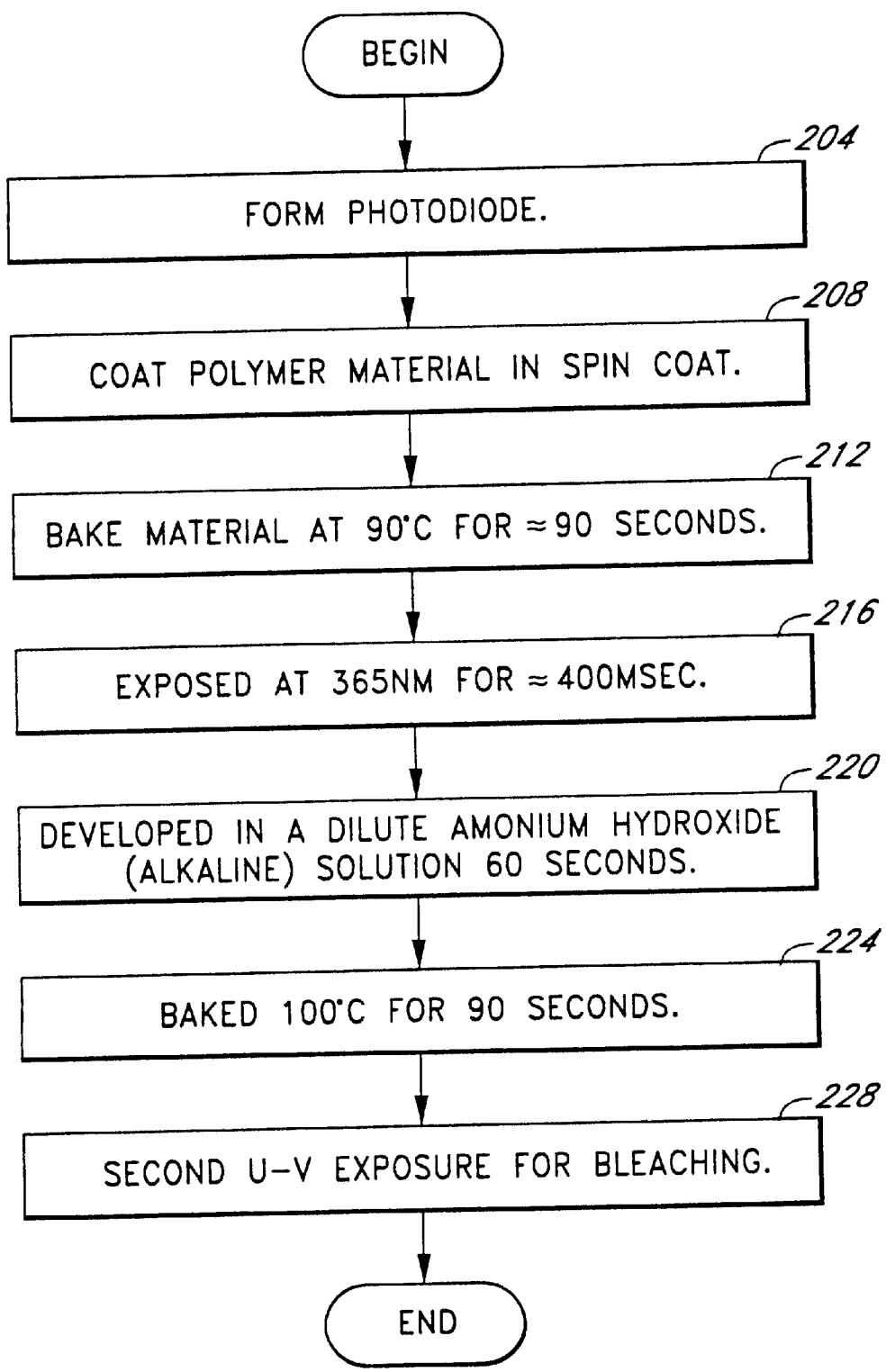
FIG. 2 is a flow diagram illustrating one embodiment of a method used to fabricate a microlens.

FIG. 2 is a flow diagram illustrating the operations used to form the microlens. In block 204 a light sensitive device or sensor is formed. The sensor may be a photo diode or other, typically, silicon-based light detection mechanism. The fabrication of the light sensing device also is associated with the formation of non-organic structures such as metal lines, typically upon a semiconductor wafer.

In block 208, a microlens resist is spin coated over the sensor. In one embodiment, the microlens resist is composed of a polymer material. The microlens resist may include a pigment to cause the formation of color mircolens capable of filtering predetermined colors of light. A description of such a microlens is described in co-pending patent application entitled "Color Microlens and a Method for Creating" (Application Ser. No. 09/052,609 filed Mar. 31, 1998, now U.S. Pat. No. 6,271,900) by Zong-Fu Li and assigned to the same assignee. In block 212, the polymer material is baked at approximately 90° C. for approximately 90 seconds to cure the polymer coat.

To form the device structures on the microlens resist, light from a light source passes through transparent portions of a mask or pattern on the reticle. A lens system focuses an image of the reticle at an image point. Light continues past the offset distance to irradiate the microlens resist while the microlens is at the irradiating distance in block 216. In one embodiment, the surface of the microlens resist is exposed to light of approximately 365 nanometers wavelength at typical intensities between 0.6 and 1 w/cm$^2$ (watts per square centimeter) for a period of approximately 400 milliseconds. During the irradiation, the microlens resist is positioned at an irradiating distance, the irradiating distance is equal to the offset distance 144 added to the imaging distance 140. The offset distance 144 is typically between 2 and 5 micrometers. In one embodiment of the invention, the entire surface of the microlens resist 120 cannot be exposed in a single exposure, thus a stepper may move the surface of the microlens resist in a controlled or programmed pattern (maintaining a constant distance from the lens) to allow the entire surface of the microlens resist to be exposed to appropriate amounts of light. In one embodiment, the movement is in a direction perpendicular to the Z direction defined in FIG. 1.

In block 220, the exposed microlens resist is developed in a developer solution to remove excess material. In one embodiment, the developer solution is a dilute ammonium hydroxide alkaline photoresist solution and the development time is approximately 60 seconds. After completion of step 220, the form of the microlens is approximately complete. In order to dry the microlens, the microlens is baked at a temperature of approximately 100° C. for approximately 90 seconds in block 224.

In block 228, a bleaching process is performed to remove remaining photosensitive material in the microlens. In the bleaching process, the microlens is subjected to a second exposure of high-intensity ultraviolet light In the second UV exposure, the high-intensity light typically exceeds 100 W/cm$^2$ (watts per square centimeter) and the wavelength of light may range from approximately 250 nanometers to approximately 400 nanometers for a period of approximately 60 seconds. This operation is to improve the light transmission characteristics of the microlens.

The determination of the offset distance of FIGS. 1A–1B, is performed during a characterization process. Ray tracing matrix computation programs are available for computing the result of moving an object out of an image plane of a lens. Using such programs an optimum offset distance may be computed to generate the desired microlens shape. Examples of microlens shapes formed at various distances are illustrated in FIGS. 3A through 3E.

Figure 3A:
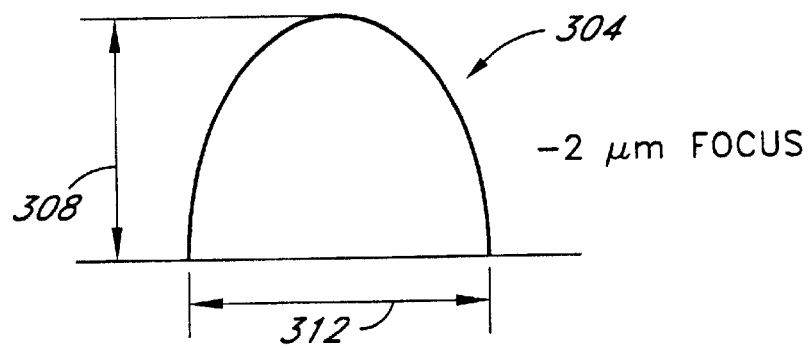
FIGS. 3A–3E illustrate examples of microlens formed using different aerial image focus offset values.
Figure 3B:
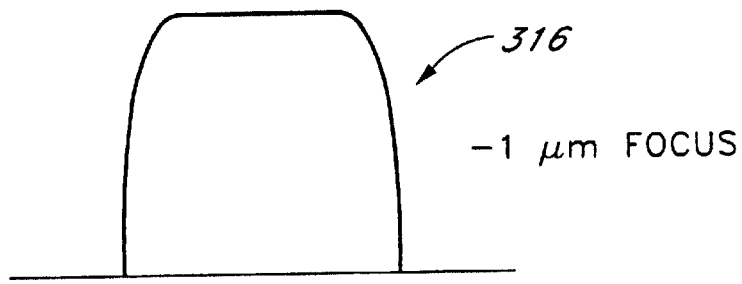

FIGS. 3A through 3E provide an example of moving an aerial image from negative 2 micrometers to positive 2 micrometers. Negative 2 micrometers is defined to indicate that the actual image point is 2 micrometers above the microlens resist or an offset distance of 2 micrometers. FIG. 3A illustrates an example of an ideally formed microlens 304. The microlens 304 was formed by creating an aerial image 2 micrometers above the surface of the microlens resist. To form the lens shown, the wavelength of light irradiating the microlens is approximately 365 nanometers. The microlens height 308 from the top of the microlens to the bottom of the microlens is approximately 1.5 microns while the microlens diameter 312 is approximately 10 microns. As the offset distance is reduced, the curvature of the microlens 304 is also reduced. FIG. 3B illustrates the microlens structure 316 formed when the aerial image is generated 1 micrometer above the surface of the microlens resist.

Figure 3C:
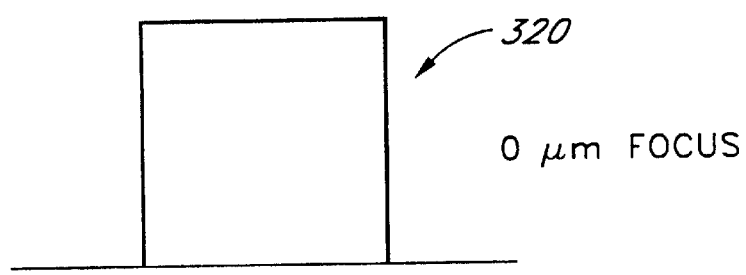
Figure 3D:
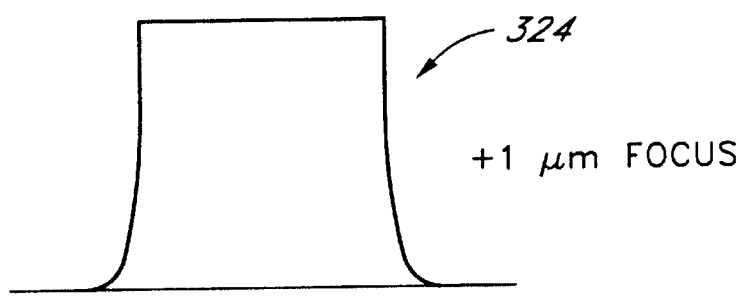
Figure 3E:
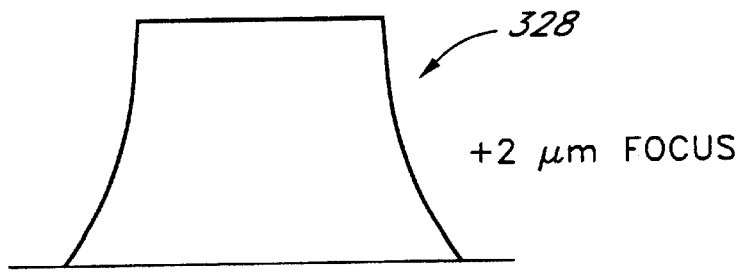

At perfect focus, when the reticle is imaged by the lens system on the microlens resist, a rectangular or square image of the reticle mask or pattern is formed on the microlens resist resulting in a square structure 320 as illustrated in FIG. 3C. As the imaging point of the lens system is moved beyond the microlens resist and substrate, the structure illustrated in FIG. 3D is created. FIG. 3D shows the effect of moving the aerial image to a positive 1 micrometer position (focusing of the image point beneath the surface of the microlens resist). FIG. 3E illustrates the microlens 328 formed when the imaging point is set 2 micrometers beneath the surface of the microlens resist.

In order to form a microlens with the desired curvature, the aerial image is typically focused approximately 2.5 micrometers above the microlens resist surface. When color filters are fabricated in conjunction with the microlens, the color filter material must be accounted for, resulting in a movement of the image point upward an additional 1.5 micrometers. In such cases, the total resulting offset distance is approximately 5 micrometers.

In the foregoing specification the invention has been described with reference to specific exemplary embodiments thereof. It will, however, be evident that various modifications and changes may be made thereto without departing from the broader spirit and scope of the invention as set forth in the pending claims. The specification and drawings are accordingly, to be regarded in an illustrative rather than a restrictive sense.

What is claimed is:

1. An apparatus for forming a microlens comprising:
   a reticle to mask ultraviolet light;
   a lens to focus an image of the reticle at an imaging distance from the lens;
   a micolens resist; and,
   a stepper programmed to position the microlens resist for forming a microlens used as an optical element to focus light, the microlens resist being an radiating distance from the lens during a lithographic process, the irradiating distance equal to the imaging distance added to a predetermined offset.

2. The apparatus of claim 1 wherein the irradiating distance is less than the imaging distance.

3. The apparatus of claim 1 wherein the reticle includes a square mask for generating an approximately square image at the imaging distance.

4. The apparatus of claim 1 further comprising: an ultraviolet light source to produce the ultraviolet light masked by the reticle.

5. The apparatus of claim 4 wherein the light source is configured to irradiate the portions of the substrate with ultraviolet light having a wavelength between 300 and 400 nanometers and an intensity between 0.6 and 1 watt per square centimeter.

6. A device comprising:
   a sensor; and
   a microlens focusing light to the sensor, the microlens being configured by positioning a microlens resist an irradiating distance from a lens, irradiating the microlens resist with defocused light to form a defocused image of a mask on the microlens resist, developing the microlens resist in a solution to form microlens, and exposing the microlens to a light to improve light transmission characteristics of the microlens.

7. The device of claim 6 wherein the sensor is a photo diode.

8. The device of claim 6 wherein a curvature of the microlens is increased by positioning the microlens resist further away from a focal length of the lens.

9. The device of claim 6 wherein the microlens resist is a positive photoresist.

10. The device of claim 9 wherein the microlens resist is made of a positive acrylic-based photopolymer.

11. The device of claim 6 wherein the microlens resist is a negative photoresist.

12. The device of claim 6 wherein the microlens resist is irradiated with multiple exposures of defocused light.

* * * * *

UNITED STATES PATENT AND TRADEMARK OFFICE
CERTIFICATE OF CORRECTION

PATENT NO.    : 6,507,439 B1
DATED         : January 14, 2003
INVENTOR(S)   : Wester It is certified that error appears in the above-identified patent and that said Letters Patent is hereby corrected as shown below:

Column 2,
Line 36, delete "len", insert -- lens --.

Signed and Sealed this

Twenty-fifth Day of March, 2003

JAMES E. ROGAN
*Director of the United States Patent and Trademark Office*